Nov. 10, 1964     N. TREGUBENKO     3,156,758
OPTICAL AMUSEMENT DEVICE
Filed Jan. 17, 1962
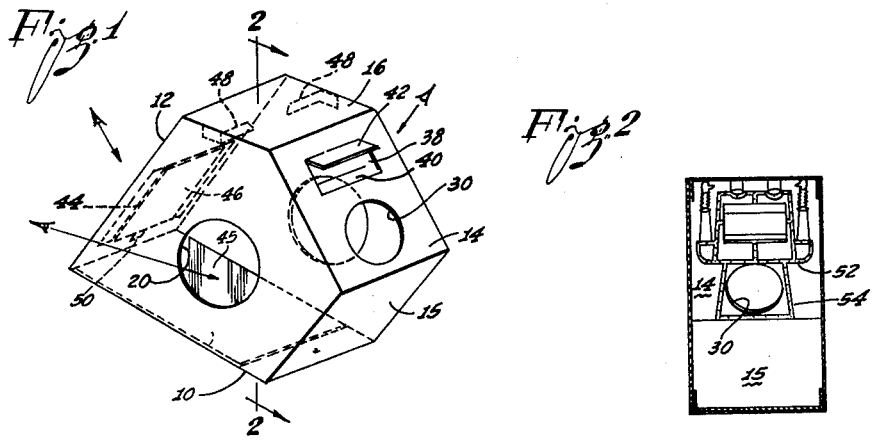
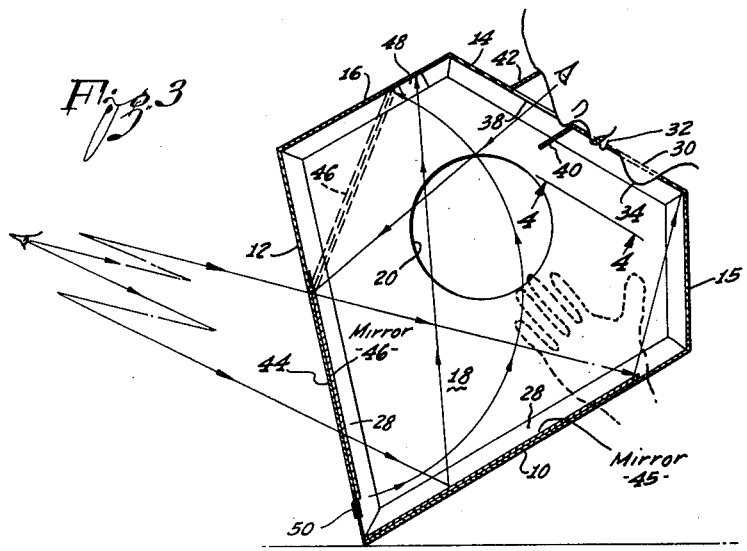
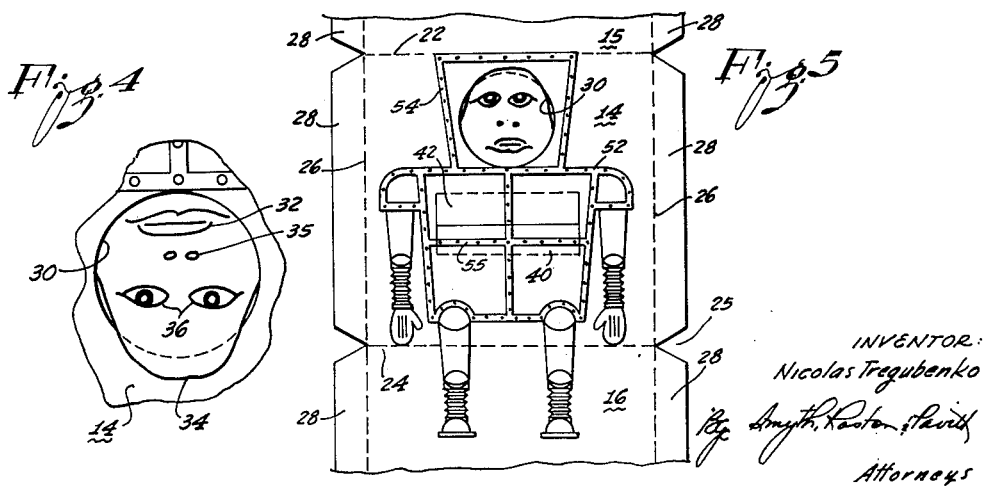
INVENTOR:
Nicolas Tregubenko
Attorneys

United States Patent Office 3,156,758
Patented Nov. 10, 1964

3,156,758
OPTICAL AMUSEMENT DEVICE
Nicolas Tregubenko, 1748 W. 1st St., San Pedro, Calif.
Filed Jan. 17, 1962, Ser. No. 166,886
4 Claims. (Cl. 88—75)

This invention relates to an optical amusement device of the type set forth in the Wood Patent 1,590,463 which permits an operator to employ a portion of a space in the region of his lips and chin with added representations on his chin of a pair of eyes and a nose in inverted position to produce a grotesque face image for the amusement of observers.

The device disclosed in the Wood patent is of the general character of a cabinet which is placed on a table and which has a horizontal top wall with the opening therein that receives the portion of the operator's face in the region of his lips and chin. With the cabinet opening located in the top horizontal wall, the operator must lean over to an uncomfortable extent to position his lips and chin at the cabinet opening.

The present invention serves the convenience and comfort of the operator by providing such a device in the form of a simple enclosure that is so light in weight that it may be easily and conveniently held by hand by the operator in position close to his face and thus obviate the necessity of the operator stooping over to the level of a table top. For further comfort and convenience, the opening for the operator's lips and chin is located in a rear wall that is inclined upward at a relatively steep inclination so that the operator need merely incline his head forward to place his lips and chin at the opening.

A problem arises in the use of such an amusement device in that when the opening for the lips and chin of the operator is provided in a planar wall, the operator's nose abuts the planar wall adjacent the opening and prevents the operator from positioning his lips and chin for a desirably snug fit in the opening. The Wood patent offers a solution to this problem by providing a small aperture in the wall to receive the operator's nose. This solution is not satisfactory because the operator's nose and the small aperture to receive the nose should not be visible to the observers. In the present invention the problem is met by providing an ample aperture for the sake of comfort, instead of a small aperture, for the operator's nose and by providing a baffle to mask both the opening and the operator's nose from view by the observers.

The operator himself should be given an opportunity to view the grotesque face image for guidance in achieving amusement effects and to promote skill. In the Wood disclosure a special viewing aperture for the operator is provided in the same horizontal wall and an auxiliary mirror is provided to reflect the image from the main mirror to this viewing port, this second mirror being located above a relatively large forward window through which the observers view the grotesque face image. The difficulty is that the second mirror must be relatively small because of lack of space.

In the new construction, the auxiliary mirror is hingedly mounted to swing from a viewing position across the window to an upper idle position above the window. This arrangement permits the use of an auxiliary mirror as large as the window and also permits the locating of the auxiliary mirror at an advantageously low position.

A further feature in this regard is the provision of at least one side window and preferably two opposite side windows through which observers may view the reflection of the grotesque face image from the main mirror. When the auxiliary mirror is in use at the position masking the forward window, the side windows are available to permit observers and the operator to view the grotesque face image simultaneously. When the auxiliary mirror is retracted upward to unmask the forward window so that observers may use the forward window, the side windows may also be used by additional observers to increase the number of people that may view the amusing face image.

Another advantage of using a relatively large auxiliary mirror at a relatively low position is that the aperture provided for the user's nose is so located relative to the auxiliary mirror that the aperture may be enlarged to serve also as a viewing port for the operator. The nose aperture may be enlarged for this purpose because the previously mentioned baffle may be correspondingly enlarged to keep the eyes of the operator from being visible to the observers.

A still further feature of the invention is that the amusement device may be made of cardboard or like thin light sheet material. Such a construction has the important advantage of being inexpensive and especially so because the walls of the enclosure may be joined simply by fold lines. The baffle to mask the nose-receiving aperture may be simply a bent flap provided by cutting the aperture in the sheet material.

A still further important advantage of the folded sheet construction is that a many-sided enclosure may be provided of a configuration to suit the function of the device. Thus a bottom wall of the device may be inclined at an optimum angle for the main mirror so that the main mirror may be mounted flat on the bottom wall instead of being inclined upward at an angle away from the bottom wall.

The features and advantages of the invention may be understood from the following detailed description and the accompanying drawing.

In the drawing, which is to be regarded as merely illustrative:

FIG. 1 is a perspective view of the presently preferred embodiment of the invention;

FIG. 2 is a transverse section taken on the line 2—2 of FIG. 1 showing the opening at which the operator places his lips and chin and showing a drawing in upside down position of an image on the inner surface of the enclosure adjacent the opening to represent the body of a grotesque being that is to be associated with the image of a face provided by the operator;

FIG. 3 is a longitudinal sectional view of the device in an operating position in conjunction with the operator's face;

FIG. 4 is a view of the operator's face from the interior of the enclosure as seen along the line 4—4 of FIG. 3; and FIG. 5 is a fragmentary view of a flat sheet of cardboard ready to be folded for the fabrication of the device, the flat sheet including the opening for the operator's face and indicating in dotted lines the character of face image that is achieved by the operator.

The enclosure of the presently preferred embodiment of the invention shown in FIGS. 1 and 3 has a bottom wall 10, a front wall 12 and an upper rear wall 14 that is connected to the bottom wall by a lower rear wall 15 and is connected to the front wall be a top wall 16. The enclosure is completed by the two side walls 18 each of which has a side window 20 in the form of a circular opening.

A feature of the invention is that the walls 10, 12, 14, 15 and 16 are successive panels of a single sheet of cardboard, the cardboard blank being of the configuration indicated in FIG. 5 wherein the successive panels are separated by fold lines, the panels 14 and 15 being separated by a fold line 22 and the panels 14 and 16 being separated by a fold line 24. The sheet of cardboard has V-shaped notches 25 cut at the opposite ends of each fold line and is further folded along the longitudinal lines 26 to form marginal flaps 28 which are folded and bonded to the two side walls 18 as indicated in FIG. 3. A feature of this construction is that the device may be shipped in a flat knocked down state. For this purpose, the two side panels 18 are left disconnected from the remaining panels except panel 10 or 12 and the remaining panels are folded against panel 10 or 12.

The upper rear wall 14 has an opening 30 which may be a circular opening and which is large enough to enclose the operator's lips 32 and chin 34. As shown in FIG. 4, the portion of the operator's face that is exposed to the opening 30 has depicted thereon a nose 35 just below the operator's lips and a pair of eyes 36 on the operator's chin below the depiction of the nose. Thus the portion of the operator's face that fills the opening 30 depicts a face in inverted position.

The panel 14 has an aperture 38 to receive the operator's nose in the manner indicated in FIG. 3 and this aperture may be a transverse slot wide enough to serve not only as an opening for the operator's nose but also as a window through which the operator may view the interior of the enclosure. In forming this transverse aperture 38 the cardboard is cut and folded to form a lower baffle 40 that extends into the interior of the enclosure and an upper baffle 42 that extends outward from the enclosure toward the operator's face. The lower baffle 40 masks the operator's nose from view by observers and the upper baffle 42 masks the operator's eyes and forehead from view and also masks off exterior objects from view.

The front wall 12 has a lower, relatively large rectangular window 44 indicated in dotted lines in FIG. 1 and the bottom wall 10 carries a main mirror 45 on its inner surface to reflect an image of the operator's face through the rectangular window to observers. An auxiliary mirror 46 is hingedly mounted to the upper edge of the rectangular window 44 to swing between a normal upper idle position indicated by dotted lines in FIG. 3 and a lower position shown in solid lines, at which lower position the auxiliary mirror covers the rectangular window 44. Suitable latch means which may comprise hinged cardboard tabs 48 (FIG. 1) is provided to releasably hold the auxiliary mirror 46 at its upper idle position, and a second suitable friction latch 50 may be provided to releasably secure the mirror at its lower position in the plane or parallel to the plane of the front wall 12.

Any suitable image of a body may be depicted on the inner surface of the closure for association with the opening 30 that is occupied by the operator's face to represent a body for the head that is represented by the lips and chin of the operator. Since the image of the face on the operator's chin is upside down and is reversed for the benefit of the observers by the main mirror 45, the body that is depicted on the inner surface of the enclosure is also upside down.

The depicted body may be of the character shown in FIGS. 2 and 5, FIG. 2 showing the image as it is actually depicted upside down on the interior surfaces of the enclosure and FIG. 5 showing the image as it is inverted to upright position by the main mirror 45 for the benefit of the observers. In this particular embodiment of the invention the body image is the image of a space man wearing a space suit 52 and a space helmet 54, the depiction of the space helmet surrounding the opening 30 that is used by the operator.

As shown in FIG. 5, the major portion of the depiction of the body is on the panel 14 but the legs of the figure are extended onto the panel 16. It will also be noted in FIG. 5 that a transverse line 55 of the depicted space suit is largely on the lower baffle 40 of the aperture or transverse slot 38. In this particular embodiment of the invention the front wall 12 is inclined rearward, being at an angle of 72° relative to the bottom wall 10. The upper rear wall 14 is inclined forward at an angle of 60° relative to the bottom wall 10.

The manner in which the device functions may be readily understood from the foregoing description. The operator holds the lightweight enclosure in his hands as indicated in FIG. 3 at whatever position serves his purpose. An observer looking into the enclosure through the rectangular window 44, as indicated by the arrows, sees the upright image shown in FIG. 5. Additional observers may view the image as reflected by the main mirror 45 through the two side windows 20.

When the operator desires to view the image to check the results or to practice different effects, he reaches through one of the side windows 20, unlatches the elevated auxiliary mirror 46, and swings the auxiliary mirror to its lower frictionally latched position. The image of the lower portion of the operator's face is then reflected by the main mirror 45 to the auxiliary mirror 46 and is reflected from the auxiliary mirror 46 through the opening 38 to the operator's eyes. While the operator is employing the enclosure in this manner, observers may view the image through the side windows 20.

My description in specific detail of the selected embodiment of the invention will suggest various changes, substitutions and other departures from my disclosure within the spirit and scope of the appended claims.

I claim:

1. An amusement device to permit an operator to employ a portion of his face in the region of his lips and chin with added representations on his chin of a pair of eyes and a nose in inverted position to produce a grotesque face image for the amusement of observers, said device comprising:

a lightweight portable structure to be held by the operator in front of his face, said structure having a front window, said structure having a bottom wall that is upwardly and rearwardly inclined and having a rearward wall that is upwardly and forwardly inclined, said rearward wall having an opening therein to encircle said region of the operator's face and further having an aperture above said opening dimensioned to receive the operator's nose and to permit the operator to look through the aperture, said inclined bottom wall having a mirror surface to reflect an image of the area of said opening to the observers forwardly through said window;

a baffle extending forwardly from said rearward wall below said aperture to mask the operator's nose from reflection by said mirror surface through said window; and a mirror carried by said structure movable between an idle position and a second position masking said window at an angle to reflect said image from the first mentioned mirror to said aperture for viewing by the operator.

2. An amusement device as set forth in claim 1 in which said mirror is hingedly mounted above said window to swing to an upper and forwardly facing idle position; and which includes means to latch the mirror in said upper idle position.

3. An amusement device as set forth in claim 1 in which said structure has at least one side wall with an auxiliary window therein to reflect said image from the mirror surface to observers whereby the operator and the observers may view an image of the area of said opening simultaneously.

4. An amusement device to permit an operator to employ a portion of his face in the region of his lips and chin with added representations on his chin of a pair of eyes and a nose in inverted position to produce a grotesque face image for the amusement of observers, said device comprising:

a lightweight portable structure adapted to be held by the operator in an effective position in front of the operator's face, said structure in its operative position having a bottom wall that is rearwardly upwardly inclined, a rear wall that is forwardly upwardly inclined in a plane at an acute angle to the bottom wall, and a forwardly upwardly inclined front wall at an acute angle to the planes of both the rear wall and the bottom wall, said front wall having a lower window, said rearward wall having an opening therein to encircle said region of the operator's face and further having an aperture above said opening dimensioned not only to receive the operator's nose but also to permit the operator to look forwardly through the aperture, said inclined bottom wall having a mirror surface to reflect an image of the area of said opening to the observers forwardly through said window;

a baffle extending inwardly from said rearward wall below said aperture to mask the aperture and the operator's nose from reflection by said mirror surface through said window; and a mirror hingedly pivotally mounted adjacent the upper edge of said window, said mirror being movable between a forwardly facing idle position above the window and a lower rearwardly facing effective position masking the window at an angle to reflect said image from the mirror surface to said aperture for viewing by the operator.

References Cited by the Examiner
UNITED STATES PATENTS

| | | | |
|---|---|---|---|
| 1,590,463 | 6/26 | Wood | 88—75 |
| 2,187,765 | 1/40 | Walter | 88—29 |
| 3,074,319 | 1/63 | McGovern | 88—75 |

JEWELL H. PEDERSEN, *Primary Examiner*.